United States Patent
Schwartz

(10) Patent No.: US 8,375,124 B1
(45) Date of Patent: Feb. 12, 2013

(54) RESUMABLE UPLOAD FOR HOSTED STORAGE SYSTEMS

(75) Inventor: Michael F. Schwartz, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/267,582

(22) Filed: Oct. 6, 2011

(51) Int. Cl.
*G06F 15/173* (2006.01)
*G06F 15/18* (2006.01)
*H04L 1/18* (2006.01)
*H04J 3/24* (2006.01)

(52) U.S. Cl. ......... 709/224; 709/233; 714/748; 370/473

(58) Field of Classification Search .................. None
See application file for complete search history.

(56) References Cited

U.S. PATENT DOCUMENTS

| | | | | |
|---|---|---|---|---|
| 7,058,085 | B2 * | 6/2006 | Earnshaw et al. | 370/473 |
| 7,181,667 | B2 * | 2/2007 | Argyropoulos et al. | 714/748 |
| 7,467,200 | B2 * | 12/2008 | Lehto et al. | 709/224 |
| 8,000,246 | B2 * | 8/2011 | Huh | 370/235 |
| 2009/0254675 | A1 * | 10/2009 | Harrang et al. | 709/233 |
| 2010/0058134 | A1 * | 3/2010 | Matsui | 714/748 |
| 2010/0077024 | A1 * | 3/2010 | Yun | 709/203 |

OTHER PUBLICATIONS

"Google Storage for Developers, API Overview," as of Jun. 8, 2011, http://code.google.com/apis/storage/docs/developer-guide.html, retrieved from http://web.archive.org/web/20110608214651/http://code.google.com/apis/storage/docs/developer-guide.html, 11 pages.
Bidelman, Eric, "Google Data Protocol: Resumable Media Uploads in the Google Data Protocol," Feb. 2010, reprinted from http://code.google.com/apis/gdata/docs/resumable_upload.html on Oct. 6, 2011, 7 pages.
"ResumableHttpRequestsProposal," updated Apr. 25, 2010, reprinted from http://code.google.com/p/gears/wiki/ResumableHttpRequestsProposal on Oct. 6, 2011, 6 pages.

* cited by examiner

*Primary Examiner* — Wen-Tai Lin
(74) *Attorney, Agent, or Firm* — Fish & Richardson P.C.

(57) ABSTRACT

An initial portion of an object is received at a hosted storage system. The initial portion of the object is stored at the hosted storage system. After receiving the initial portion of the object, a timer is started. Prior to the expiration of the timer, whether an additional portion of the object is received at the hosted storage system is determined. The initial portion is deleted upon the expiration of the timer if the additional portion is not received. The timer is reset if the additional portion is received.

26 Claims, 4 Drawing Sheets

RESUMABLE UPLOAD FOR HOSTED STORAGE SYSTEMS

BACKGROUND

This specification relates to hosted storage systems.

A hosted storage system may provide a remote user the ability to store data files without acquiring additional local storage resources. One concern for uploading data files to hosted storage systems is an unexpected interruption during the uploading process.

SUMMARY

In one aspect, an initial portion of an object is received at a hosted storage system. The initial portion of the object is stored at the hosted storage system. After receiving the initial portion of the object, a timer is started. Prior to the expiration of the timer, whether an additional portion of the object is received at the hosted storage system is determined. The initial portion is deleted upon the expiration of the timer if the additional portion is not received. The timer is reset if the additional portion is received.

Implementations may include one or more of the following features. The additional portion of the object may be received at the hosted storage system, and whether a size of the received, additional portion exceeds a threshold size is determined. The initial portion is deleted upon expiration of the timer if the size of the additional portion does not exceed the threshold. Resetting the timer may include resetting the timer if the size of the additional portion exceeds the threshold. The threshold size may include a percentage of a size of the object's size. The threshold size may include a defined number of bytes.

The additional portion of the object may be received at the hosted storage system, and whether the received, additional portion completes the object is determined. Resetting the timer can include resetting the timer if the received, additional portion does not complete the object. Receiving the initial portion of the object may include receiving the initial portion of the object as part of an interrupted upload of the object.

Receiving the initial portion of the object may include receiving, at the hosted storage system and from a client system, an initial upload request that does not include the object. In response to receiving the initial upload request, an object identifier may be sent to the client system. A revised upload request is received at the hosted storage system and from the client system, where the revised upload request may include the object identifier and the object, wherein the revised upload request is interrupted such that only the initial portion of the object is received by the hosted storage system. A resumed upload request is received at the hosted storage system and from the client system, where the resumed upload request may include the object identifier. In response to receiving the resumed upload request, a range of bytes that correspond to the initial portion of the object is determined based on the object identifier. The range of bytes is sent from the hosted storage system and to the client system. The additional portion of the object from the client system starting after the range of bytes is received at the hosted storage system.

In another aspect, a hosted storage system includes a service interface configured to receive an initial portion of an object, at least one data store configured to store the initial portion of the object, and a garbage collector configured to start a timer after the initial portion of the object is received, to determine whether an additional portion of the object is received at the hosted storage system prior to the expiration of the timer, to delete the initial portion upon the expiration of the timer if the additional portion is not received, and to reset the timer if the additional portion is received.

Implementations may include one or more of the following features. The service interface may be configured to receive the additional portion of the object at the hosted storage system. The garbage collector may be configured to determine whether a size of the received, additional portion exceeds a threshold size, to delete the initial portion upon expiration of the timer if the size of the additional portion does not exceed the threshold, and to reset the timer if the additional portion of the object is received and the size of the received, additional portion exceeds the threshold. The threshold size may be a percentage of a size of the object's size. The threshold size may be a defined number of bytes.

The service interface may be configured to receive the additional portion of the object at the hosted storage system. The garbage collector may be configured to determine whether the received, additional portion completes the object, and to reset the timer if the additional portion of the object is received and the received, additional portion does not complete the object. The initial portion of the object may be received as part of an interrupted upload of the object.

The service interface may be configured to receive the initial portion of the object, where an initial upload request that does not include the object is received from a client system. In response to receiving the initial upload request, an object identifier is sent to the client system, and a revised upload request is received from the client system, where the revised upload request may include the object identifier and the object, wherein the revised upload request may be interrupted such that only the initial portion of the object is received by the hosted storage system. The service interface is configured to receive a resumed upload request from the client system, where the resumed upload request may include the object identifier. In response to receiving the resumed upload request, a range of bytes that correspond to the initial portion of the object may be determined based on the object identifier. The range of bytes may be sent to the client system. The additional portion of the object starting after the range of bytes may be received form the client system.

In another aspect, a computer readable medium having stored instructions that, when executed by one or more processors, causes the one or more processors to perform the operations of receiving and storing an initial portion of an object at a hosted storage system. After receiving the initial portion of the object, a timer is started. Prior to the expiration of the timer, whether an additional portion of the object is received at the hosted storage system is determined. If the additional portion is not received, the initial portion is deleted upon the expiration of the timer. If the additional portion is received, the timer is reset.

Implementations may include one or more of the following features. The additional portion of the object may be received at the hosted storage system, and whether a size of the received, additional portion exceeds a threshold size is determined. The initial portion is deleted upon expiration of the timer if the size of the additional portion does not exceed the threshold. Resetting the timer may include resetting the timer if the size of the additional portion exceeds the threshold. The threshold size may include a percentage of a size of the object's size. The threshold size may include a defined number of bytes.

The additional portion of the object may be received at the hosted storage system, and whether the received, additional portion completes the object is determined. Resetting the timer can include resetting the timer if the received, additional portion does not complete the object. Receiving the initial portion of the object may include receiving the initial portion of the object as part of an interrupted upload of the object.

Receiving the initial portion of the object may include receiving, at the hosted storage system and from a client system, an initial upload request that does not include the object. In response to receiving the initial upload request, an object identifier may be sent to the client system. A revised upload request is received at the hosted storage system and from the client system, where the revised upload request may include the object identifier and the object, wherein the revised upload request is interrupted such that only the initial portion of the object is received by the hosted storage system. A resumed upload request is received at the hosted storage system and from the client system, where the resumed upload request may include the object identifier. In response to receiving the resumed upload request, a range of bytes that correspond to the initial portion of the object is determined based on the object identifier. The range of bytes is sent from the hosted storage system and to the client system. The additional portion of the object from the client system starting after the range of bytes is received at the hosted storage system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In general, a client system is coupled to a hosted storage service system in which user-provided data upload processes can be resumed after interruptions have occurred. For example, in one implementation, the client system initializes an upload request for a data object to be stored at the hosted storage service. The hosted storage system keeps a timer on the data object upload, where the hosted storage system starts and resets the timer each time a portion of the data object has been received. In the event of an interruption, the client system submits a separate request for a resumable upload for the same data object. If the timer for the data object at the hosted storage service has not expired, the hosted storage service can allow the client system to resume uploading the same data object without having to restart the upload process. If the timer expires before an additional portion of the object has been received (that is, before the user has resumed the upload and sent an additional portion of the object), the portion of the object already received is deleted.

Implementations may include one or more of the following advantages. The storage space at the hosted storage service can be efficiently utilized and controlled if the hosted storage service does not need to allocate new storage space each time a data object upload process is interrupted and re-initiated. The upload of a data object with a large size (e.g. several Terabytes) can be resumed upon one or more interruptions with one unique object identifier, where the upload does not need to restart from the beginning each time an interruption has occurred. Data management time and resources on the client system can be reduced, if data object upload process can be resumed upon unexpected interruptions. In some cases, starting or resetting the timer upon a partial completion of the upload may enable a simple and uniform standard for monitoring upload processes regardless of the size of the data files to be uploaded. As one example, the hosted storage service system does not need to adjust the length of the timer associated with a data file according to the size of the file. For instance, if instead the timer was started when the object began uploading, then whether or not the timer expired before the uploading was complete would depend on the size of the object and the upload speed. Thus, in that case, large objects or ones being uploaded across slow networks might not finish uploading before the timer expires and, accordingly, become deleted during the uploading.

Figure 1:
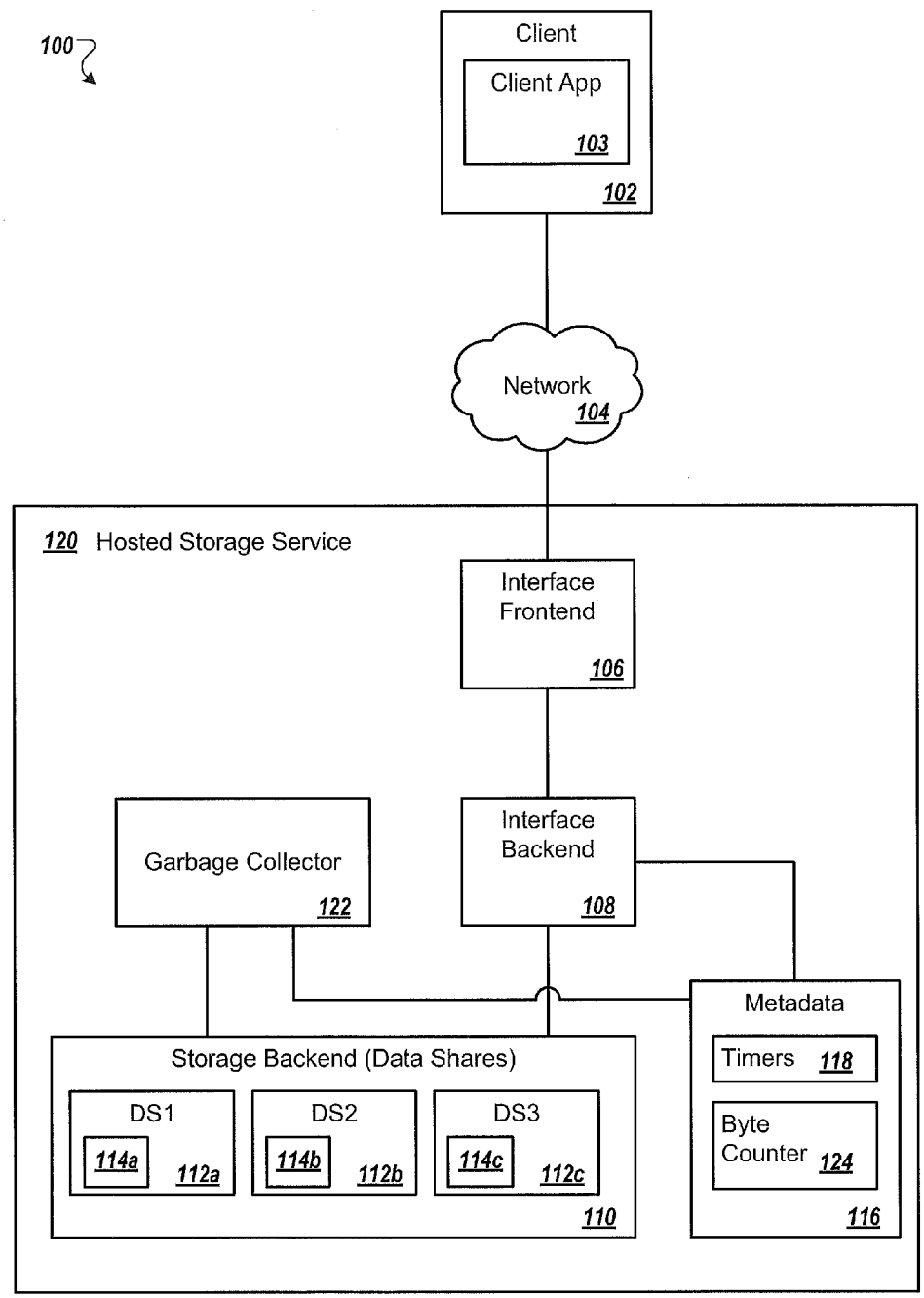
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device 102. In some implementations, a hosted storage service 120 can provide access to stored data by applications running on computing devices geographically separated from each other, provide offsite data backup and restore functionality, provide data storage to a computing device with limited storage capabilities, and/or provide storage functionality not implemented on the client device 102.

The system 100 can provide scalable stores for storing data objects. The client device 102 can upload data objects to the hosted storage service 120 and resume the uploading process of the data objects if the uploading process has been interrupted by an unexpected event. For example, the unexpected event can be a component, system, or connection failure from the client device 102, the hosted storage service 120, or a network 104 that provides a connection between the client device 102 and the hosted storage service 120. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for mutual business reasons (e.g., submission of work product ordered by the owner of the hosted storage service 120), or for use in data processing by other services (e.g., images uploaded are used to automatically and dynamically create a photo gallery web page).

Figure 4:
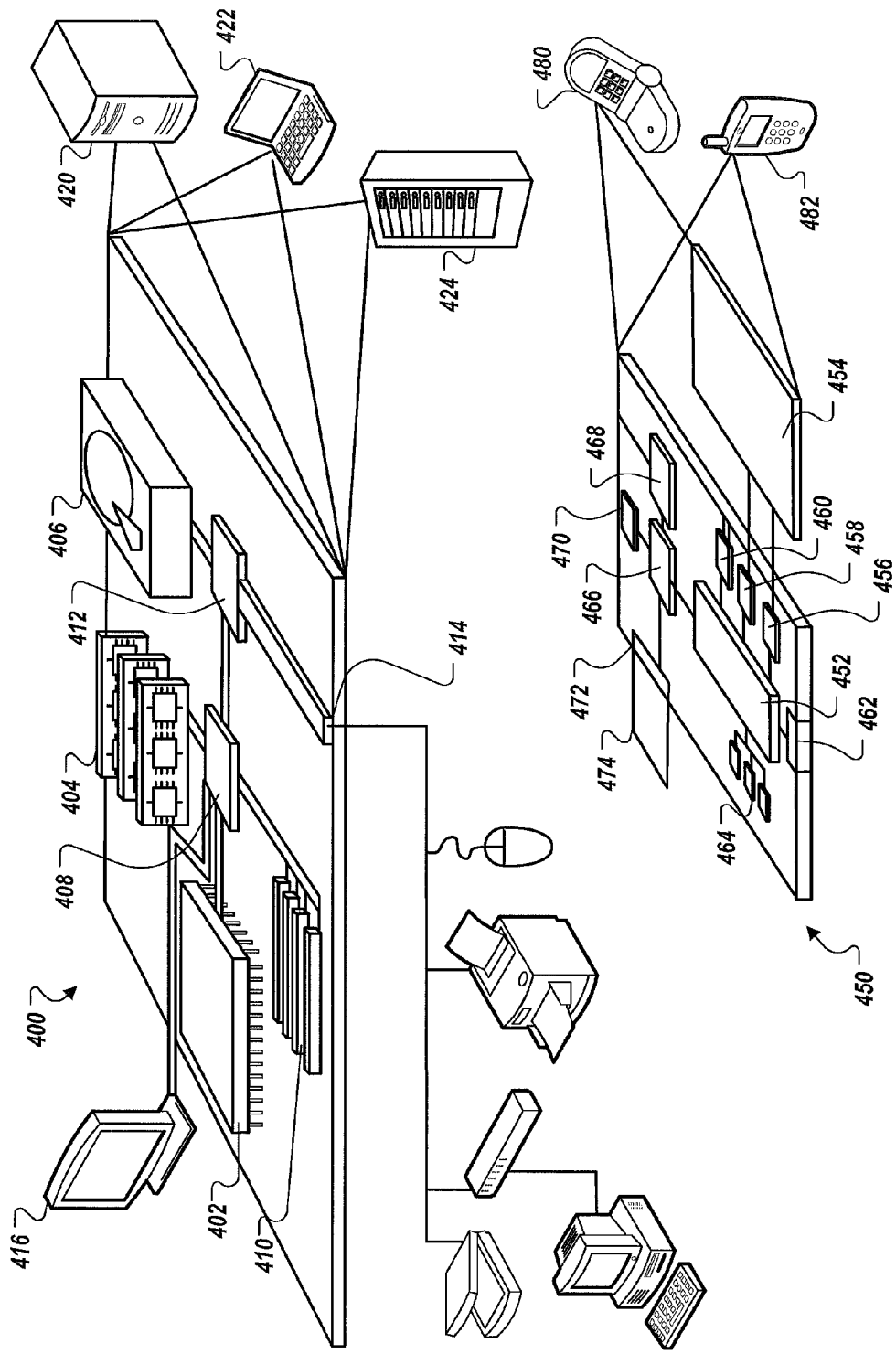
FIG. 4 shows an example of a computing device and a mobile computing device.

The client device 102 can be implemented using a computing device, such as the computing device 400 or the mobile device 450 described with respect to FIG. 4. The client device 102 can communicate with the hosted storage service 120 via the network 104, such as the Internet. The client device 102 can communicate across the network 104 using communication protocols such as, for example, one or more of Transmission Control Protocol/Internet Protocol (TCP/IP), Hypertext Transfer Protocol (HTTP), Secure Shell Remote Protocol (SSH). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data objects, such as objects 114a, 114b, and 114c, in the hosted storage service 120. The hosted storage service 120 can be implemented by one or more server devices, which can be implemented using a computing device, such as the computing device 400 or mobile device 450 described with respect to FIG. 4. For example, the hosted storage service 120 can be implemented by multiple server devices operating in the same, or different, data centers.

The hosted storage service 120 generally includes an interface frontend 106, an interface backend 108, a storage backend 110, metadata 116 for objects stored in the storage backend 110, and a garbage collector 122. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 120. The PUT and POST verbs may be used to upload an object to the service 120. PUT requests can come from the client 102 and contain authentication and authorization credentials and object metadata in a header, such as an HTTP header. In some implementations, the PUT requests can contain instructions for resuming previously-interrupted upload processes. POST requests can be received when a client 102 wants to upload from a web browser form. The form POST upload protocol for the hosted storage service 120 can involve multiple required form fields to provide authentication, authorization and object metadata. POST requests may alternatively, or additionally, be used to initiate or resume resumable uploads.

In general, objects stored in the hosted storage service 120 can be referenced by object identifiers. The hosted storage service 120 can define namespaces to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers.

Objects can be stored in hosted storage service 120 in buckets. In some examples, each bucket is uniquely named in the hosted storage service 120, each object is uniquely named in a bucket, and every bucket and object combination is unique. Objects may be uniquely identified by a URI that includes the bucket name and the object name, and identifies the hosted storage service 120. For example, an object named "long/song.mp3" in a bucket named "music" could be specified using a URI pattern such as http://s.hostedstoragesystem.com/music/long/song.mp3 or http://music.s.hostedstoragesystem.com/long/song.mp3. Alternatively, the user of the client 102 can create a bucket named www.music.org, publish a CNAME alias redirecting that to http://music.s.hostedstoragesystem.com, and address the object as http://www.music.org/long/song.mp3. In some examples, buckets do not nest.

The interface backend 108 can process upload requests including resumable upload requests, can handle request authentication and authorization, can manage data and metadata, and can track activities such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted.) The interface backend can also provide encryption and decryption services to prevent unauthorized access to data, even by internal users.

The interface backend 108 can manage metadata 116 associated with data objects 114a, 114b, and 114c, for example in a structured data format such as a database (e.g., MySQL). In some implementations, user-specified names labeling the buckets can be completely defined within the metadata 116, and object metadata 116 can map a resource name to one or more datastores 112a, 112b, or 112c storing the resource. The metadata 116 can also include bucket and object creation times, object sizes, hashes, access control lists, timers 118, and byte counters 124 for both buckets and objects. Each of the timers 118 can be associated with a data object, such as one of the objects 114a, 114b, or 114c, and can indicate the amount of time remaining until the data object associated with the particular timer is deleted from the storage backend 110. One or more components in the hosted storage service 120 can control the timer reset, including the garbage collector 122. In some implementations, the garbage collector 122 can set a timer associated with a data object when the upload process has been initiated for the data object. In some implementations, the garbage collector 122 can reset the timer associated with a data object when a portion of the data object has been received and stored at the storage backend 110. In the event of an interruption, the garbage collector 122 can start the counting down of the timer, and can reset the timer upon the hosted storage service 120 receiving more of the data object, or can remove the data object upon the timer expiring. Each of the byte counters 124 can be a data structure associated with a data object, and can be referenced to indicate the portion of the corresponding data object that has been uploaded. In the event of an interruption, the byte counter 124 can be referenced later in a resumed upload to determine the portion of the data object that has been uploaded prior to the interruption. The interface backend 108 can log activity and track storage consumption to support accounting for billing and chargebacks. In some examples, this includes quota monitoring in each dimension in which customers are charged (e.g., reads, writes, network transfers, total storage in use).

A garbage collector 122 can determine whether to delete or remove a data object from the hosted storage service 120. In some implementations, the garbage collector 122 can determine whether to delete the received portion of a data object from the hosted storage service 120 during a resumed upload process. The garbage collector 122 can start a timer after an initial portion of a data object is received at the hosted storage system 120. Prior to the expiration of the timer, the garbage collector 122 can determine whether an additional portion of the data object is received at the hosted storage system 120. If the additional portion has not been received, the garbage collector 122 can delete the initial portion of the data object upon the expiration of the timer. If the additional portion has been received, the garbage collector 122 can reset the timer. In the event that the upload is interrupted and the garbage collector 122 determines whether the upload is resumed and more of the data object is received at the hosted storage system 120. If more of the object has not been received, the garbage collector 122 can delete the accumulated portion of the data object upon the expiration of the timer. If more of the object has been received prior to the timer expiring, the garbage collector 122 can reset the timer. In the event that the whole data object is received, the garbage collector 122 can stop the timer associated with the data object.

The storage backend 110 can contain multiple datastores 112a-112c. Although three datastores 112 are shown, more or fewer are possible. Each of the datastores 112a-112c can store data objects 114a-114c in a particular format. For example, data store 112a can store a data object 114a as a Binary Large Object (BLOB), data store 112b can store a data object 114b in a distributed file system (e.g., Network File System), and data store 112c can store a data object 114c in a structured data format such as a database (e.g., MySQL).

Figure 2:
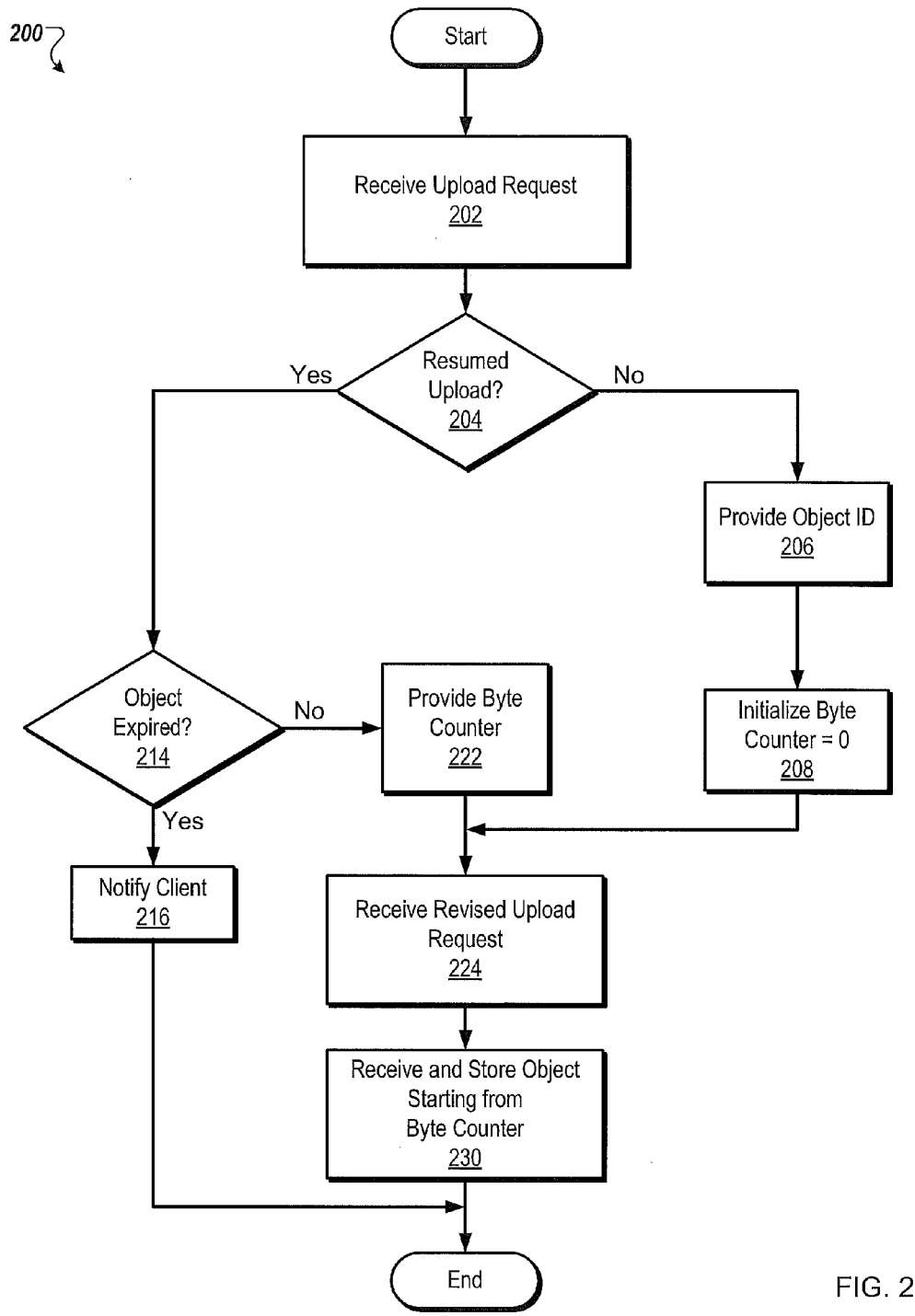
FIG. 2 is a flow chart illustrating an example of a process for uploading a data object to a hosted storage service system.

FIG. 2 is a flow chart illustrating an example of a process 200 for uploading a data object to a hosted storage service system. The process 200 can be performed by, for example, the interface frontend 106, the interface backend 108, and the garbage collector 122, and for clarity of presentation, the description that follows uses the system 100 as the basis for describing the process. However, another system, or combination of systems, may be used to perform the process 200.

An upload request is received by the interface frontend 106 from the client application 103 to upload a data object (202). In some implementations, the data object may have a determined object size at the time of the request. In some other implementations, the data object may be a streaming data object such as voice or video, and may not have a determined object size at the time of the request. The request headers can include a HTTP PUT or POST request, an authentication credential that authenticates the principal (entity) making the request, a data object, an object type, an object identifier, an object size, an indication that this request is for a resumable upload, and a target for the object consisting of a bucket and data object name. The interface frontend 106 can make a RPC to the interface backend 108 including the request headers.

The interface backend 108 determines whether the upload request from the client application 103 is a request to resume a previously interrupted upload (204). In one implementation, the interface backend 108 can parse the header of an HTTP POST or PUT request to identify attributes related to resumable uploads. As one example, an HTTP POST request can include a customized attribute {name: value} pair such as {Resumable: Start} to indicate that this request is a new upload request, and that the client application 103 supports resumable uploads. For example, the interface backend 108 can receive a request for a new upload as:

POST/music.mp3 HTTP/1.1
Host: example.commondatastorage.googleapis.com
Date: Fri, 01 Oct 2010 21:56:18 GMT
Content-Length: 0
Content-Type: audio/mpeg
x-goog-resumable: start
x-goog-api-version: 2
Authorization: OAuth 1/zVNpoQNsOSxZKqOZgckhpQ where the POST verb and the {name: value} pair {x-goog-resumable: start} along with other parameters indicate that this is a request for a new object upload, where a resumable upload is supported by the client application 103.

As another example, an HTTP PUT request can include an object identifier of an existing data object as an indication that this request is for resumable upload of a previously interrupted upload process (described further below).

In the event that the interface backend 108 determines that the request is not for resuming a previously interrupted upload and does not include a data object, the interface backend 108 creates and sends a RPC which includes an object identifier to the interface frontend 106. The interface frontend 106 then sends a response which includes the object identifier to the client device 102 (206). For instance, the interface frontend 106 may send a 201 Created status message, which indicates to the client device 102 that a new object identifier has been created (and the status message may include the object identifier). In some implementations, the object identifier can be a sequence of Unicode characters whose UTF-8 encoding is at most 1024 bytes long. In some other implementations, the object identifier can be a globally unique identifier (GUIDs), which may be 128-bit integers. For example, the interface frontend 106 may send a HTTP CREATED message to the client device 102 as:

HTTP/1.1 201 Created
Location: https://example.commondatastorage-.googleapiscom/music.mp3? upload_id=tvA0ExBntDa . . . gAAEnB2Uowrot
Date: Fri, 01 Oct 2010 21:56:18 GMT
Content-Length: 0
Content-Type: audio/mpeg where a new object identifier, as indicated as "upload_id=tvA0ExBntDa . . . gAAEnB2Uowrot," is included in the "Location" attribute of the message. The client application 103 can then associate the object identifier with the object during this and future uploading processes.

The interface backend 108 then creates metadata 116 associated with the data object, including initializing a byte counter 124 for the data object to zero (208). In some implementations, the byte counter 124 can be a data structure associated with the data object, and can be referenced to indicate the portion of a data object that has been uploaded. The interface backend 108 can allocate a segment of storage space at the storage backend 110. If the request includes information about the object type, the interface backend 108 can allocate the segment of storage space in the datastore 112 associated with the object type.

A revised upload request is received by the interface frontend 106 from the client application 103 to upload the data object (224). In the revised upload request, the request headers can include a HTTP PUT verb, the object identifier, the data object, the object size, and the authentication credentials. The interface frontend 106 can make a RPC to the interface backend 108 including the revised request headers. For example, the interface frontend 106 can receive a revised upload request for a new object upload as:

PUT/music.mp3?upload_id=tvA0ExBntDa  .  .  .
gAAEnB2Uowrot
    HTTP/1.1
    Host: example.commondatastorage.googleapis.com
    Date: Fri, 01 Oct 2010 21:56:18 GMT
    Content-Length: 7351375
    x-goog-api-version: 2
    Authorization: OAuth 1/zVNpoQNsOSxZKqOZgckhpQ
where the unique object identifier associated with the new object is included in the HTTP PUT request. The content length of the object is also included in the request, where the interface backend 108 can store the content length information in the metadata 116 associated with the object.

Upon receiving the revised upload request, the interface backend 108 receives the data object from the client device 102 starting from the current value of the byte counter (230). Here, since the request is for uploading a new data object, the interface backend 108 receives the initial portion of the data object. The interface backend 108 can then store the initial portion of the object at the storage backend 110. The garbage collector 122 can update the metadata 116 associated with the object including the timer 118 and the byte counter 124. The interface backend 108 can continue to receive and store the additional portions of the data object at the storage backend 110, and the garbage collector 122 can update the metadata 116 accordingly until the upload is complete or interrupted, or until the timer 118 associated with the data object expires.

In the event that the interface backend 108 determines that the request is for resuming a previously interrupted upload (204), the interface backend 108 retrieves the object identifier from the request, and the interface backend 108 determines whether the resumed object upload has expired (214). For example, the interface frontend 106 can receive a resume request from the client application 103 as:

PUT/music.mp3?upload_id=tvA0ExBntDa  .  .  .
gAAEnB2Uowrot HTTP/1.1
    Host: example.commondatastorage.googleapis.com
    Date: Fri, 01 Oct 2010 22:25:53 GMT
    Content-Range: bytes*/7351375
    Content-Length: 0
    x-goog-api-version: 2
    Authorization: OAuth 1/zVNpoQNsOSxZKqOZgckhpQ
where the object identifier is included in the "upload_id" of the request. The request also includes a "Content-Range" attribute, where the length of the object is specified, but the sent portion of the object is indicated as "*" to query the interface backend 108 on the portion of the object already uploaded prior to the interruption. The interface backend 108 can then associate the object identifier in the request with the object in the storage backend 110, and determine the portion of the object already uploaded.

In some implementations, the garbage collector 122 can delete the accumulated portion of the object uploaded in the storage backend 110 upon the timer 118 associated with the object expiring. The interface backend 108 can then determine whether the resumed object upload has expired by checking whether the object is still stored at the storage backend 110.

In the event that the interface backend 108 determines that the resumed object upload has expired, the interface backend 108 notifies the interface frontend 106. The interface frontend 106 can then send a response to the client device 102 (216). In one implementation, the response is a 404 Not Found status message, which indicates to the client device 102 that the resumed object upload has expired and the data object and the corresponding metadata 116 have been deleted.

In the event that the garbage collector 122 determines that the resumed object upload has not expired, the interface backend 108 can make a RPC to notify the interface frontend 106, including information on the range of bytes which has been uploaded and stored at the storage background 110. In some implementations, the interface backend 108 can retrieve information on the range of bytes received from the byte counter 124 of the metadata 116 associated with the data object. The interface frontend 106 can then send a response including the byte counter 124 associated with the data object to the client device 102 (222). In one implementation, the response is a 308 Resume Incomplete status message, which indicates to the client device 102 that the resumed object upload has not expired and the data object has not been completely uploaded and stored at the storage backend 110. The status message may include the range of bytes that have been received. For example, the interface frontend 106 can send a response for the resumed upload as:

HTTP/1.1 308 Resume Incomplete
    Range: bytes=0-2359295
    Date: Fri, 01 Oct 2010 22:25:53 GMT
    Content-Length: 0
    Content-Type: audio/mpeg
where the attribute "Range" specifies the range of bytes already uploaded and stored at the storage backend 110 prior to the resumed upload request. In some implementations, the information on the range of bytes already uploaded can be retrieved from the byte counter 124 associated with the object.

A revised upload request is then received by the interface frontend 106 from the client application 103 to resume the upload of the data object (224). In the revised upload request, the request headers can include a HTTP PUT verb, the object identifier, the data object, the object size, the authentication credentials, and the range of the data object to be uploaded in the resumed upload process. In one implementation, the range of the data object to be uploaded can be the lowest and highest byte-indices of the data object which have not been uploaded to the storage backend 110 upon the resumed upload request. The interface frontend 106 can make a RPC that includes the revised request headers to the interface backend 108. For example, the interface frontend 106 can receive a revised upload request for a resumed upload as:

PUT/music.mp3?upload_id=tvA0ExBntDa  .  .  .
gAAEnB2Uowrot HTTP/1.1
    Host: example.commondatastorage.googleapis.com
    Date: Fri, 01 Oct 2010 22:25:53 GMT
    Content-Range: bytes 2359296-7351374/7351375
    Content-Length: 4992079
    x-goog-api-version: 2
    Authorization: OAuth 1/zVNpoQNsOSxZKqOZgckhpQ
where the object identifier is included in the request, so the interface backend 108 can associate the request with the object. The attribute "Content-Range" indicates the portion of object to be uploaded to the storage backend 110 to complete the object, where the starting value reflects the byte counter 124 associated with the object.

Upon receiving the revised upload request, the interface backend 108 receives the data object from the client device 102 starting from the current value of the byte counter 124 (230). Since the request is for resuming the upload of an existing data object, the interface backend 108 receives the portion of the data object which has been previously interrupted. The interface backend 108 then can store the previously interrupted portion of the object at the storage backend 110. The garbage collector 122 can update metadata 116 associated with the object including the timer 118 and the byte counter 124. The interface backend 108 can continue to receive and store the additional portions of the data object at the storage backend 110, and the garbage collector 122 can update the metadata 116 accordingly until the upload is complete or interrupted, or until the timer 118 associated with the data object has expired.

Figure 3:
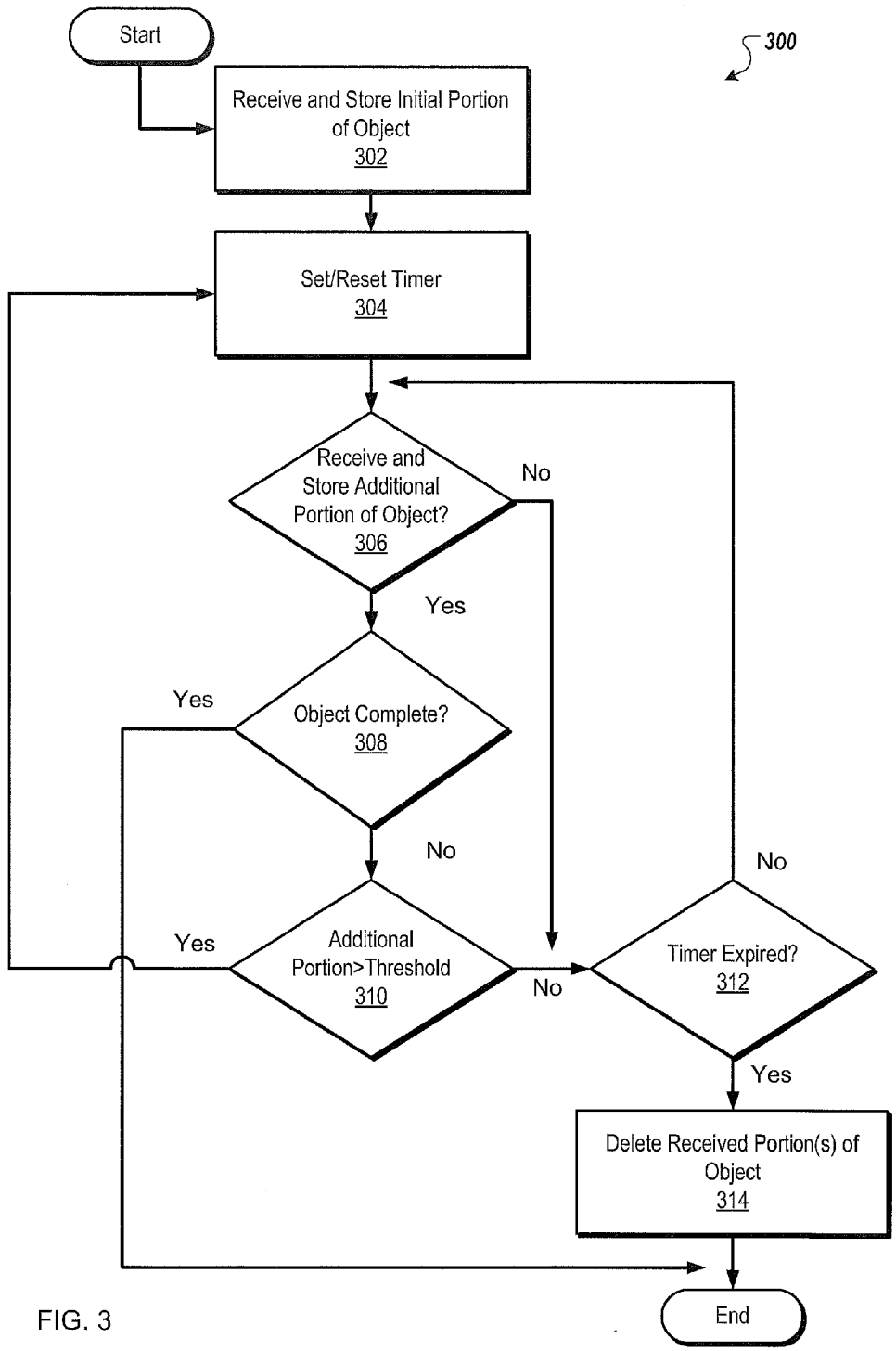
FIG. 3 is a flow chart illustrating an example of a process for managing a timer with an object upload process.

FIG. 3 is a flow chart illustrating an example of a process 300 for managing a timer with an object upload process. The process 300 can be performed by, for example, the interface backend 108 and the garbage collector 122, and for clarity of presentation, the description that follows uses the system 100 as the basis for describing the process. However, another system, or combination of systems, may be used to perform the process 300.

The interface backend 108 receives an initial portion of an object, and stores the initial portion at the storage backend 110 (302). In some implementations, the initial portion is associated with a new object where the corresponding byte counter 124 is zero. The initial portion can include the first byte to another byte earlier than the final byte of the object, where the remaining bytes of the object are not uploaded due to an unexpected interruption. For example, the unexpected interruption can be a component, system, or connection failure from the client device, the hosted storage service, or a network that provides a connection between the client device and the hosted storage service.

Upon the interface backend 108 receiving the initial portion of the object and storing the initial portion at the storage backend 110, the garbage collector 122 starts a timer 118 associated with the object (304). In some implementations, the timer 118 is included in the metadata 116, where the timer 118 identifies the remaining time prior to the garbage collector 122 deleting the object. The expiration time of the timer 118 can be configured automatically or manually by an administrator of the hosted storage service system 120.

Prior to the expiration of the timer 118, the interface backend 108 determines whether an additional portion of the object is received at the interface backend 108 (306). In the event that the interface backend 108 has not received any additional portion of the object, the garbage collector 122 continues to determine whether the timer 118 has expired (312). In the event that the garbage collector 122 determines that the timer 118 has expired (312) prior to receiving the additional portion of the object (306), the garbage collector 122 deletes the initial portion of the object at the storage backend 110 and deletes the metadata 116 associated with the object (314).

In the event that the interface backend 108 has received and stored an additional portion of the object, the garbage collector 122 determines whether the object upload is complete (308). In the event that the garbage collector 122 determines that the object upload is not complete, the garbage collector 122 determines whether the size of the received additional portion exceeds a predetermined threshold size (310). In some implementations, the threshold size can be a percentage of the object's size. In some other implementations, the threshold size can be a defined number of bytes. In some implementations, the threshold size can be selected to optimize network utilization or to avoid a denial of service attack, where a malicious user can upload a portion of the object and then upload the remaining object at a very slow rate. For example, if the garbage collector 122 resets the timer 118 every time a byte is received, then a malicious user may trickle data to the system, potentially allowing him or her to occupy large amounts of space in the storage backend 110. The solution could be to enforce that at least N bytes have been uploaded during the timer 118 countdown period, with N chosen so the user has real network costs associated with this attack.

In the event that the garbage collector 122 determines that the size of the additional portion does not exceed the threshold size, the garbage collector 122 continues to determine whether the timer 118 has expired (312). In the event that the garbage collector 122 determines that the timer 118 has not expired, the garbage collector 122 continues to determine whether the interface backend 108 has received and stored more portions of object, and if so, whether the accumulated additional portion of the object exceeds the threshold size (310) prior to the timer expiring (312). In the event that the garbage collector 122 determines that the timer 118 has expired (312), the garbage collector 122 then deletes the portion of the object stored at the storage backend 110 and deletes the metadata 116 associated with the object (314).

In the event that the garbage collector 122 determines that the size of the accumulated additional portion exceeds the threshold size prior to the timer 118 expiring, the garbage collector 122 resets the timer associated with the object (304). The process 300 then continues to receive portions of the object until the object is either completely uploaded at the storage backend 110, or the object is deleted from the hosted storage service 120 upon the timer 118 expiring.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a microdrive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
    receiving, at a hosted storage system, an initial portion of an object;
    storing, at the hosted storage system, the initial portion of the object;
    after receiving the initial portion of the object, starting a timer;
    prior to the expiration of the timer:
        receiving an additional portion of the object at the hosted storage system, wherein the additional portion of the object does not complete the object;
        determining that the additional portion of the object was received at the hosted storage system; and
        in response to determining that the additional portion of the object was received at the hosted storage system, resetting the timer;
    after resetting the timer and upon expiration of the reset timer:
        determining that a second, additional portion of the object was not received at the hosted storage system; and
        in response to determining that the second, additional portion of the object was not received at the hosted storage system, deleting the initial portion of the object and the additional portion of the object.

2. The method of claim 1, wherein resetting the timer comprises:
    determining that a size of the received, additional portion exceeds a threshold size; and
    in response to determining that the size of the additional portion exceeds the threshold size, resetting the timer.

3. The method of claim 2 wherein the threshold size is a percentage of the object's size.

4. The method of claim 2 wherein the threshold size is a defined number of bytes.

5. The method of claim 1, wherein resetting the timer comprises:
- determining that the received, additional portion does not complete the object;
- in response to determining that the received, additional portion does not complete the object, resetting the timer.

6. The method of claim 1 wherein receiving the initial portion of the object comprises receiving the initial portion of the object as part of an interrupted upload of the object.

7. The method of claim 1 wherein receiving the initial portion of the object comprises:
- receiving, at the hosted storage system and from a client system, an initial upload request that does not include the object;
- in response to receiving the initial upload request, sending an object identifier to the client system; and
- receiving, at the hosted storage system and from the client system, a revised upload request, the revised upload request including the object identifier and the object, wherein the revised upload request is interrupted such that only the initial portion of the object is received by the hosted storage system.

8. The method of claim 7 further comprising:
- receiving, at the hosted storage system and from the client system, a resumed upload request, the resumed upload request including the object identifier;
- in response to receiving the resumed upload request, determining, based on the object identifier, a range of bytes that correspond to the initial portion of the object;
- sending, from the hosted storage system and to the client system, the range of bytes;
- receiving, at the hosted storage system and from the client system, the additional portion of the object starting after the range of bytes.

9. A hosted storage system comprising:
- a service interface configured to receive an initial portion of an object;
- at least one data store configured to store the initial portion of the object;
- a garbage collector configured to:
  - start a timer after the initial portion of the object is received;
  - prior to the expiration of the timer, determine that an additional portion of the object was received at the hosted storage system, wherein the additional portion of the object did not complete the object; and
  - in response to determining that the additional portion of the object was received at the hosted storage system, reset the timer;
  - after resetting, the timer and upon expiration of the reset timer:
    - determine that a second, additional portion of the object was not received at the hosted storage system; and
    - in response to determining that the second, additional portion of the object was not received at the hosted storage system, delete the initial portion of the object and the additional portion of the object.

10. The system of claim 9 wherein
the service interface is configured to receive the additional portion of the object at the hosted storage system; and
the garbage collector is configured to:
- determine that a size of the received, additional portion exceeds a threshold size; and
- in response to determining that the size of the received, additional portion exceeds the threshold size, reset the timer.

11. The system of claim 10 wherein the threshold size is a percentage of the object's size.

12. The system of claim 10 wherein the threshold size is a defined number of bytes.

13. The system of claim 9 wherein:
the service interface is configured to receive the additional portion of the object at the hosted storage system;
the garbage collector is configured to:
- determine that the received, additional portion does not complete the object; and
- in response to determining that the received, additional portion does not complete the object, reset the timer.

14. The system of claim 9 wherein the initial portion of the object is received as part of an interrupted upload of the object.

15. The system of claim 9 wherein, to receive the initial portion of the object, the service interface is configured to:
- receive, from a client system, an initial upload request that does not include the object;
- in response to receiving the initial upload request, send an object identifier to the client system; and
- receive, from the client system, a revised upload request, the revised upload request including the object identifier and the object, wherein the revised upload request is interrupted such that only the initial portion of the object is received by the hosted storage system.

16. The system of claim 15 wherein the service interface is configured to:
- receive, from the client system a resumed upload request, the resumed upload request including the object identifier;
- in response to receiving the resumed upload request, determine, based on the object identifier, a range of bytes that correspond to the initial portion of the object;
- send the range of bytes to the client system;
- receive, form the client system, the additional portion of the object starting after the range of bytes.

17. A non-transitory computer readable medium storing instructions, which, when executed by one or more processing devices, causes the one or more processing devices to perform the operations of:
- receiving, at a hosted storage system, an initial portion of an object;
- storing, at the hosted storage system, the initial portion of the object;
- after receiving the initial portion of the object, starting a timer;
- prior to the expiration of the timer:
  - receiving an additional portion of the object at the hosted storage system, wherein the additional portion of the object does not complete the object;
  - determining that the additional portion of the object was received at the hosted storage system; and
  - in response to determining that the additional portion of the object was received at the hosted storage system, resetting the timer;
- after resetting the timer and upon expiration of the reset timer:
  - determining that a second, additional portion of the object was not received at the hosted storage system; and
  - in response to determining that the second, additional portion of the object was not received at the hosted storage system, deleting the initial portion of the object and the additional portion of the object.

18. The computer readable medium of claim 17 wherein the instructions include instructions, which, when executed by the one or more processing devices, causes the one or more processing devices to perform the operations of:
  determining that a size of the received, additional portion exceeds a threshold size; and
  in response to determining that the size of the additional portion exceeds the threshold size, resetting the timer.

19. The computer readable medium of claim 18 wherein the threshold size is a percentage of the object's size.

20. The computer readable medium of claim 18 wherein the threshold size is a defined number of bytes.

21. The computer readable medium of claim 17 wherein the instructions include instructions, which, when executed by the one or more processing devices, causes the one or more processing devices to perform the operations of:
  determining that the received, additional portion does not complete the object;
  in response to determining that the received, additional portion does not complete the object, resetting the timer.

22. The computer readable medium of claim 17 wherein, to receive the initial portion of the object, the instructions include instructions, which, when executed by the one or more processing devices, cause the one or more processing devices to perform the operation of receiving the initial portion of the object as part of an interrupted upload of the object.

23. The computer readable medium of claim 17 wherein, to receive the initial portion of the object, the instructions include instructions, which, when executed by the one or more processing devices, cause the one or more processing devices to perform the operations of:
  receiving, at the hosted storage system and from a client system, an initial upload request that does not include the object;
  in response to receiving the initial upload request, sending an object identifier to the client system; and
  receiving, at the hosted storage system and from the client system, a revised upload request, the revised upload request including the object identifier and the object, wherein the revised upload request is interrupted such that only the initial portion of the object is received by the hosted storage system.

24. The computer readable medium of claim 23 wherein the instructions include instructions, which, when executed by the one or more processing devices, causes the one or more processing devices to perform the operations of:
  receiving, at the hosted storage system and from the client system, a resumed upload request, the resumed upload request including the object identifier;
  in response to receiving the resumed upload request, determining, based on the object identifier, a range of bytes that correspond to the initial portion of the object;
  sending, from the hosted storage system and to the client system, the range of bytes;
  receiving, at the hosted storage system and from the client system, the additional portion of the object starting after the range of bytes.

25. A method comprising:
  receiving, at a hosted storage system and from a client system, an initial upload request for an object, wherein the initial upload request is an HTTP request;
  in response to receiving the initial upload request, sending an object identifier from the hosted storage system to the client system;
  receiving, at the hosted storage system and from the client system, a revised upload request, the revised upload request including the object identifier and the object, wherein the revised upload request is an HTTP request and is interrupted such that only an initial portion of the object is received by the hosted storage system;
  after receiving the initial portion of the object, starting a timer;
  prior to the expiration of the timer:
    receiving, at the hosted storage system and from the client system, a resumed upload request, wherein the resumed upload request is an HTTP request and includes the object identifier, and wherein the resumed upload request is sent from the client system because the revised upload request was interrupted;
    in response to receiving the resumed upload request, determining, based on the object identifier, a range of bytes that correspond to the initial portion of the object;
    sending, from the hosted storage system and to the client system, the range of bytes;
    receiving, at the hosted storage system and from the client system, an additional portion of the object starting after the range of bytes;
  prior to the expiration of the timer:
    determining that the received, additional portion of the object does not complete the object; and
    in response to determining that the received, additional portion of the object does not complete the object, resetting the timer;
  after resetting the timer and upon expiration of the reset timer:
    determining that a second, additional portion of the object was not received at the hosted storage system; and
    in response to determining that the second, additional portion of the object was not received at the hosted storage system, deleting the initial portion of the object and the additional portion of the object.

26. A method comprising:
  receiving, at a hosted storage system, an initial portion of an object;
  storing, at the hosted storage system, the initial portion of the object;
  after receiving the initial portion of the object, starting a timer;
  prior to the expiration of the timer:
    receiving a first, additional portion of the object at the hosted storage system, wherein the first, additional portion of the object does not complete object;
    determining that the first, additional portion of the object was received at the hosted storage system; and
    in response to determining that the first, additional portion of the object was received at the hosted storage system, resetting the timer;
  after resetting the timer but prior to a second expiration of the timer:
    receiving a second, additional portion of the object at the hosted storage system, wherein the second, additional portion of the object does not complete object; and
    determining that the second, additional portion of the object was received at the hosted storage system; and
    in response to determining that the second, additional portion of the object was received at the hosted storage system, resetting the timer a second time;
  after resetting the timer the second time and upon expiration of the reset timer:

determining that a third, additional portion of the object was not received at the hosted storage system; and in response to determining that the third, additional portion of the object was not received at the hosted storage system, deleting the initial portion of the object, the additional portion of the object, and the second additional portion of the object.

* * * * *

UNITED STATES PATENT AND TRADEMARK OFFICE
CERTIFICATE OF CORRECTION

PATENT NO. : 8,375,124 B1
APPLICATION NO. : 13/267582
DATED : February 12, 2013
INVENTOR(S) : Michael F. Schwartz Page 1 of 1

It is certified that error appears in the above-identified patent and that said Letters Patent is hereby corrected as shown below:

In the Claims:

Column 17, line 53, Claim 9, please delete "resetting," and insert therefor -- resetting --.

Signed and Sealed this
Thirteenth Day of August, 2013

Teresa Stanek Rea
*Acting Director of the United States Patent and Trademark Office*